United States Patent
Yang

(10) Patent No.: US 7,953,019 B2
(45) Date of Patent: May 31, 2011

(54) CHANNEL SWITCHING

(75) Inventor: Soo-Young Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 1123 days.

(21) Appl. No.: 11/275,713

(22) Filed: Jan. 25, 2006

(65) Prior Publication Data

US 2006/0168638 A1  Jul. 27, 2006

(30) Foreign Application Priority Data

Jan. 25, 2005 (KR) ................ 10-2005-0006796

(51) Int. Cl.
*H04L 1/00* (2006.01)

(52) U.S. Cl. ......... 370/252; 725/38; 725/87; 725/100; 348/14.05; 348/14.11

(58) Field of Classification Search ............ 370/431; 725/14

See application file for complete search history.

(56) References Cited

U.S. PATENT DOCUMENTS

| 5,193,005 A * | 3/1993 | Tomita | 348/731 |
| 6,370,153 B1* | 4/2002 | Eng | 370/438 |
| 6,636,273 B1* | 10/2003 | Weber | 348/734 |
| 7,113,484 B1* | 9/2006 | Chapman et al. | 370/252 |

FOREIGN PATENT DOCUMENTS

| JP | 10-322608 A | 4/1998 |
| JP | 2000-050176 A | 2/2000 |
| JP | 2001-016513 A | 1/2001 |
| JP | 2001-136146 A | 5/2001 |
| KR | 10-20040038280 A | 5/2004 |

* cited by examiner

*Primary Examiner* — Seema S Rao
*Assistant Examiner* — Wanda Z Russell
(74) *Attorney, Agent, or Firm* — Fish & Richardson P.C.

(57) ABSTRACT

Channel switching for a receiver for digital broadcasting includes identifying pilot data from a digital broadcasting signal. The pilot data is stored in a memory. Channel switching is performed at least based on the stored pilot information.

20 Claims, 2 Drawing Sheets

CHANNEL SWITCHING

CROSS-REFERENCE TO RELATED APPLICATIONS

This application claims priority under 35 U.S.C. §119 to Korean Patent Application No. 2005-06796, filed in Korea on Jan. 25, 2005, the entirety of which is incorporated by reference herein.

BACKGROUND

This description relates to channel switching performed by a receiver configured for digital broadcasting.

A digital broadcasting system, e.g., a digital multimedia broadcasting system, can transmit and/or receive, e.g., video data, audio data, text data, and any combination thereof. The digital broadcasting system may transmit and/or receive data using code division multiplexing (CDM), where CDM refers to a technique in which each channel transmits its bits as a coded channel-specific sequence of pulses. The digital broadcasting may also use other forms of multiplexing, such as time division multiplexing.

A transmission stream transmitted through each CDM channel includes transmission stream packets, each of which having a header with a packet identifier (PID). Thus, the digital broadcasting system may transmit a plurality of data packets. A data packet may include a header and a payload, and the header may include a packet identifier (PID).

Since each transmission stream can include several programs, the relation between the programs included in each transmission stream and video/audio data constituting each program may have to be defined. The relation may be defined by a program specification information (PSI) table. The PSI table may include a program association table (PAT) and a program map table (PMT). The PMT may include PID information of, for example, video data packets, audio data packets, and text data packets included in a specific program.

A transmission system for digital broadcasting may divide a broadcasting bandwidth into a plurality of CDM channels, and a plurality of programs may be transmitted via a CDM channel. Therefore, channel switching among the plurality of programs may have to be performed.

SUMMARY

In one general aspect, a channel switching method performed by a receiver configured for digital broadcasting may include identifying pilot data from a digital broadcasting signal, storing the pilot data in data storage, in response to receipt of a channel switching requests, retrieving the pilot data stored in the data storage, and performing channel switching from a channel associated with the digital broadcasting signal to a channel associated with a destination digital broadcasting signal based on at least the retrieved pilot data.

The method may further include identifying updated pilot data from the digital broadcasting signal and updating the pilot data in the storage using the updated pilot data.

In another general aspect, a channel switching apparatus for a receiver for digital broadcasting may include a storing unit structured to store pilot data included in a digital broadcasting signal and a channel switching controller structured to retrieve the pilot data stored by the storing unit and to perform channel switching based on at least the retrieved pilot data. The storing unit may include a buffer, a RAM, and/or a flash memory. The channel switching controller may include a microprocessor and/or a memory. The storing unit can also be structured to update the pilot signal stored by the storing unit using updated pilot data included in the digital broadcasting signal.

The channel switching controller can also be structured to determine whether channel switching is successful. Also, the storing unit can be structured to update the pilot data stored by the storing unit using updated pilot data when the channel switching is not successful.

The foregoing and other objects, features, aspects and advantages will become more apparent from the following detailed when taken in conjunction with the accompanying drawings.

DETAILED DESCRIPTION

Channel switching may involve extracting a PID included in each audio and/or video packet based on pilot data received in a digital multimedia broadcasting (DMB) receiver, identifying each audio and/or video packet based on the PID, and displaying audio and/or video data corresponding to a channel selected by a user based on the identified audio and/or video packets. In the implementation described below, to the extent that the channel to be tuned and the current channel are both receivable through the use of the same pilot data, the known pilot data of the current channel may be used in response to a channel switching request, thereby avoiding delays that otherwise might be incurred while extracting pilot data from the channel to be tuned.

A method and apparatus for processing pilot data in a receiver for digital broadcasting will be described in detail hereinafter with reference to FIGS. 1 and 2. In the implementations described below, for example, the digital broadcasting system is a digital multimedia broadcasting (DMB) system and the receiver is a DMB receiver. But, the description below can also be applied to different types of receivers and digital broadcasting systems.

Figure 1:
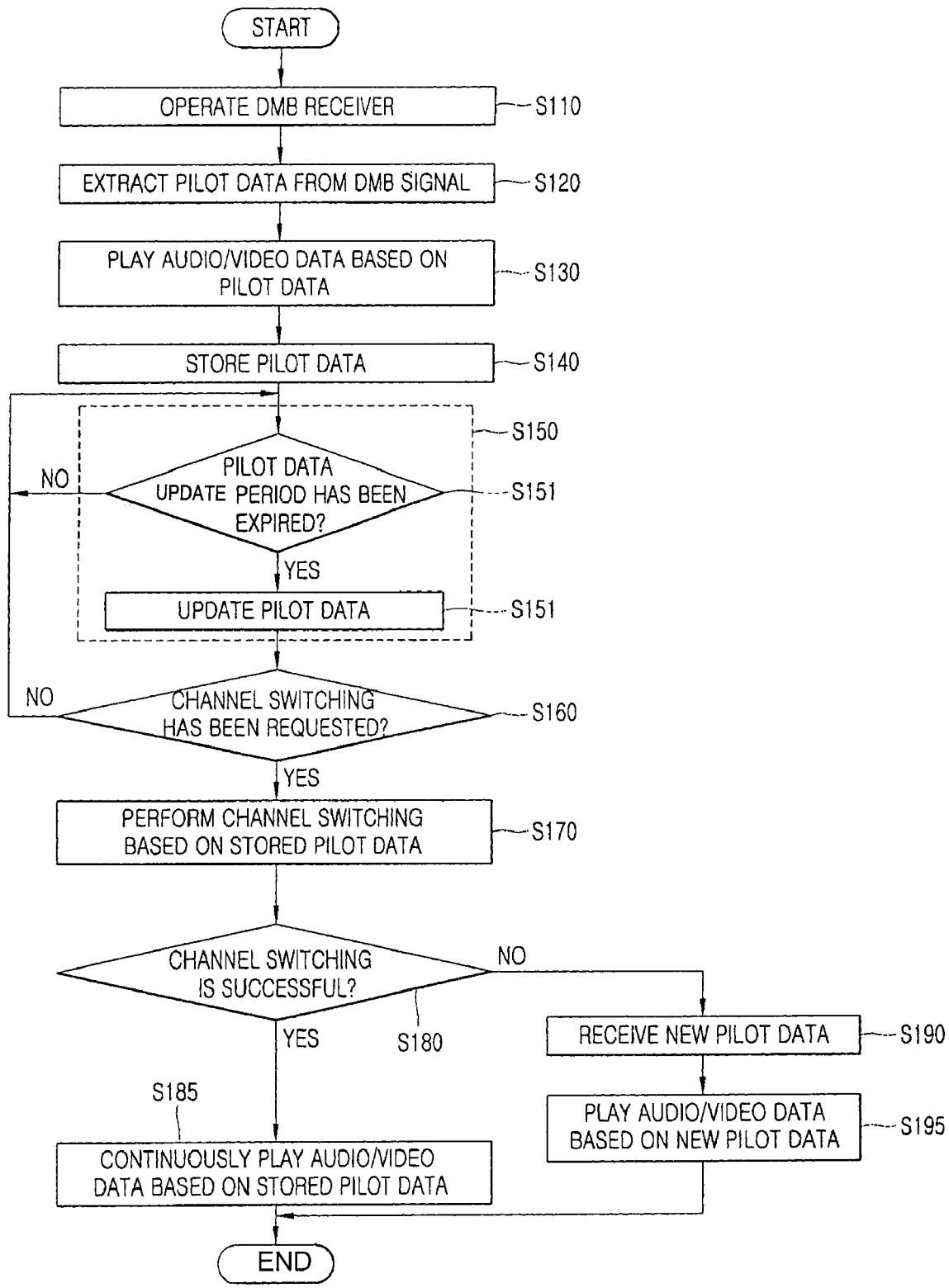
FIG. 1 is a flowchart showing an example of a channel switching method performed by a receiver configured for digital broadcasting.

Referring to FIG. 1, an exemplary channel switching method 100 is performed by a receiver configured for digital broadcasting. The receiver used in the FIG. 1 example is a DMB receiver. But, the receiver can be any receiver configured for any type of digital broadcasting. Also, although the FIG. 1 example refers only to DMB signals, the described method can be used with any digital broadcasting signal having pilot data.

The illustrated channel switching method includes operating the DMB receiver (S110), extracting pilot data from a DMB signal received through a current channel (S120), identifying audio and/or video data included in a current channel based on the pilot data and playing the identified audio and/or video data (S130), storing the pilot data in an storing unit (S140), updating the stored pilot data after a certain period of time (S150), receiving a channel switching request from a user (S160), and performing a channel switching (S170) by identifying audio and/or video data included in a channel other than the current channel (e.g., the channel specified by the switching requests, or otherwise made identifiable based on that request) based on the stored pilot data and then playing the identified audio and/or video data judging whether or not the channel switching is successful (S180), continuously playing the identified audio and/or video data when the channel switching is judged to be successful (S185), extracting new pilot data from a DMB signal received through the channel turned at (S170) when the channel switching is judged to be failed (S190), and playing the audio and/or video data based on the extracted pilot data (S195).

Updating pilot data (S150) may include judging whether or not a predetermined period of time for updating pilot data has been expired (S151), and extracting and staring new pilot data from the DMB signal when the predetermined period for updating pilot data has expired (S152).

Continuing to refer to FIG. 1, the DMB receiver may be initially operated in response to power being turned on (S110). Then, also triggered by power-up, the DMB receiver may extract pilot data included in a DMB signal transmitted from a DMB transmitter (S120). The DMB receiver may identify audio and/or video data of a current channel based on the extracted pilot data, and then may play the identified audio and/or video data (S130). Generally, a plurality of audio and/or video data transmitted through the same CDM channel can be identified based on the same pilot data.

The DMB receiver may determine one CDM channel selected by a user among a plurality of CDM channels based on the pilot data, may extract a packet identifier (PID) of one audio and/or video data packet selected by the user among a plurality of audio and/or video data packets included in the selected CDM channel based on the pilot data, and then may play audio and/or video data corresponding to the extracted PID. As discussed above, the PID of each audio and/or video data can be included in the PMT table constituting the PSI table.

Then, the DMB receiver may store the extracted pilot data (S140). The pilot data can be stored in any type of storing unit (e.g. a buffer, a RAM and/or a flash memory), for example, in the DMB receiver. The DMB receiver may update the pilot data stored in the storing unit, for example, after a predetermined period of time (S150).

The DMB receiver may determine whether or not a predetermined period of time for updating pilot data has expired (S151). If the predetermined period for updating pilot data has expired, the DMB receiver may extract new pilot data from a DMB signal transmitted through a current channel and may replace the pilot data stored in the arbitrary storing unit with the newly extracted pilot data (S152). The DMB receiver may judge whether or not a channel switching is requested by a user (S160).

When a channel switching is requested by a user, the DMB receiver identifies audio and/or video data received through a channel to be switched to based on the stored pilot data, and then plays the identified audio and/or video data thereby to perform a channel switching (S170). More specifically, the DMB receiver may determine one CDM channel selected by a user among a plurality of CDM channels based on the pilot data, may extract a packet identifier (PID) of one audio and/or video data packet selected by the user among a plurality of audio and/or video data packets received through in the selected CDM channel based on the stored pilot data, and then may play audio and/or video data corresponding to the extracted PID, thereby performing a channel switching.

Then, the DMB receiver may judge whether or not the channel switching is successful (S180). When the channel switching is judged to be successful, the DMB receiver may continue to play the identified audio and/or video data (S185). Generally, a plurality of audio and/or video data received through the same CDM channel can be identified based on the same pilot data. Therefore, the channel switching based on the stored pilot data can be successful.

When the channel switching is judged to be failed, the DMB receiver extracts a new pilot data from a DMB signal received through a channel to be switched to (S190). Generally, a plurality of audio and/or video data received through different CDM channels can be identified based on different pilot data. Therefore, if a current channel and a channel to be switched to use different CDM channels, the channel switching based on the stored pilot data extracted from a DMB signal of the current CDM channel can be failed.

The DMB receiver may identify audio and/or video data received through a channel to be switched to based on the new pilot data, and then may play the identified audio and/or video data, thereby performing a channel switching (S195).

Figure 2:
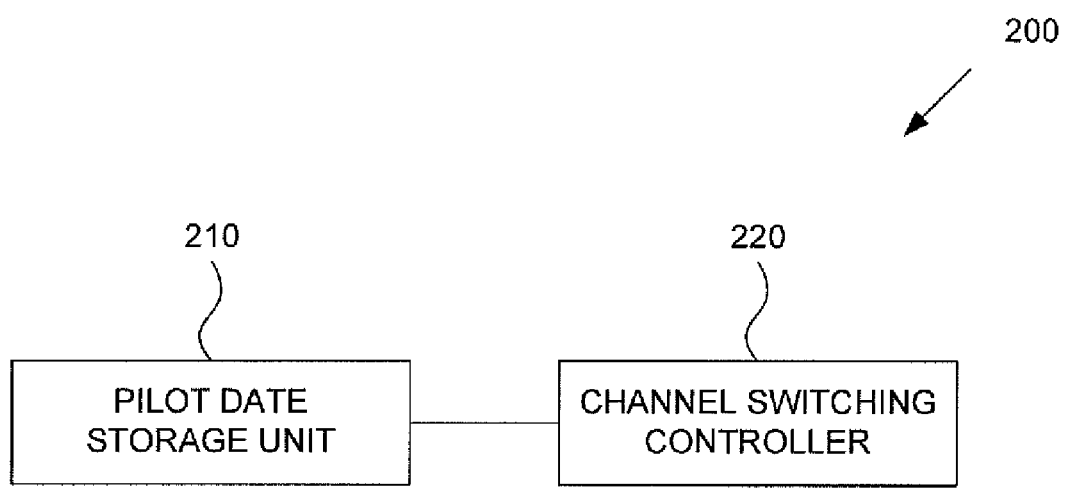
FIG. 2 is a block diagram showing an example of channel switching receiver configured for digital broadcasting.

Referring FIG. 2 an exemplary channel switching apparatus 200 is shown to be configured for digital broadcasting. The channel switching apparatus 200 includes a pilot data storing unit 210 configured to store pilot data included in a received DMB signal, and a channel switching controller 220 configured to perform a channel switching based on the stored pilot data.

The pilot data storing unit 210 may be any storing unit of the DMB receiver such as a buffer, a RAM, a flash memory, etc. The DMB receiver may extract a new pilot data from the DMB signal after a predetermined update period, and may store the new pilot data in the pilot data storing unit 210. Accordingly, the pilot data stored in the pilot data storing unit 210 can be updated after a predetermined period of time.

When a signal for requesting a channel switching is inputted to the channel switching controller 220 by the user, the channel switching controller 220 may read pilot data stored in the pilot data storing unit 210 and then may control an operation for performing a channel switching based on the pilot data. That is, the channel switching controller 220 may identify audio and/or video data included in a DMB signal received through a channel to be switched based on the stored pilot data, and then may control an audio and/or video data processor (not shown) so that the identified audio and/or video data can be played.

More specifically, the channel switching controller 220 may determine one CDM channel selected by a user among a plurality of CDM channels based on the pilot data. Then, the channel switching controller 220 may extract a packet identifier (PID) of an audio and/or video data packet among a plurality of audio and/or video data packets received through the selected CDM channel based on the stored pilot data. Next, the channel switching controller 220 may control an audio and/or video data processor (not shown) so that audio and/or video data corresponding to the extracted PID can be played, thereby performing a channel switching. The channel switching controller may include a microprocessor and a memory.

When the channel switching controller 220 judges the channel switching to be successful, the DMB receiver may continue to play the identified audio and/or video data. On the contrary, when the channel switching controller 220 judges the channel switching to be failed, the DMB receiver may extract a new pilot data from a received DMB signal, may identify audio and/or video data based on the new pilot data, and may play the identified audio and/or video data.

In the channel switching apparatus and method for a receiver for digital broadcasting, channel switching may be performed based on stored pilot data, reducing the amount of time delay in channel switching.

It should be understood that the above-described implementations are not limited by any of the details of the foregoing description. Accordingly, other implementations are within the scope of the following claims.

What is claimed is:

1. A channel switching method performed by a receiver configured for digital broadcasting, comprising:
identifying, with the receiver, pilot data from a digital broadcasting signal, wherein the digital broadcasting signal comprises the pilot data and media data comprising at least one of audio packets or video packets;
storing the pilot data in a data storage in the receiver;
in response to receipt of a channel switching request at the receiver that is received separately from the digital broadcasting signal,
retrieving the pilot data stored in the data storage in the receiver, the retrieved pilot data having been identified from the digital broadcasting signal and stored in the data storage before the receipt of the channel switching request; and
identifying, with the receiver, audio data or video data included in a channel associated with a destination digital broadcasting signal based on the stored pilot data;
attempting to perform channel switching at the receiver from a channel associated with the digital broadcasting signal to the channel associated with the destination digital broadcasting signal based on at least the retrieved pilot data;
determining whether the channel switching is successful; and
based on determining that channel switching is unsuccessful:
identifying updated pilot data from the digital broadcasting signal;
updating the pilot data in the data storage in the receiver using the updated pilot data; and
performing channel switching at the receiver from a channel associated with the digital broadcasting signal to the channel associated with the destination digital broadcasting signal based on at least the updated pilot data.

2. The method of claim 1, further comprising:
identifying updated pilot data from the digital broadcasting signal; and
updating the pilot data in the storage using the updated pilot data.

3. The method of claim 2, wherein updating the pilot data includes replacing the pilot data in the data storage with the updated pilot data.

4. The method of claim 1, wherein performing the channel switching includes identifying, based on the retrieved pilot data, broadcasting data that is selected by a user and that is included in the digital broadcasting signal.

5. The method of claim 1, wherein performing the channel switching includes identifying a code division multiplexing channel and also identifying a packet identifier based on at least the retrieved packet data.

6. The method of claim 1, wherein updating the pilot data includes replacing the pilot data in the storage with the updated pilot data.

7. The method of claim 1, further comprising processing instructions for playing the identified audio data or video data when channel switching is performed.

8. The method of claim 1, wherein the channel switching request is received from a source that is different from a source of the digital broadcast signal or a source of the destination digital broadcast signal.

9. The method of claim 8, wherein the channel switching request is received after the digital broadcasting signal is received.

10. The method of claim 1, wherein the channel switching request is received into a channel switching controller.

11. A channel switching apparatus in a receiver for digital broadcasting, comprising:
a storing unit in the receiver that is structured to store pilot data included in a digital broadcasting signal, wherein the digital broadcasting signal comprises the pilot data and media data comprising at least one of audio packets or video packets; and
a channel switching controller in the receiver structured to retrieve the pilot data stored by the storing unit in the receiver, identify audio data or video data included in a channel associated with a destination digital broadcasting signal based on the stored pilot data, and in response to receipt of a channel switching request, attempt to perform channel switching from a channel associated with the digital broadcasting signal to the channel associated with the destination digital broadcasting signal based on at least the retrieved pilot data,
wherein the channel switching controller is further structured to:
determine whether the channel switching is successful; and
based on determining that channel switching is unsuccessful, identify updated pilot data from the digital broadcasting signal, update the pilot data in the data storage in the receiver using the updated pilot data, and perform channel switching from a channel associated with the digital broadcasting signal to the channel associated with the destination digital broadcasting signal based on at least the updated pilot data.

12. The apparatus of claim 11, wherein the storing unit in the receiver includes at least one of a buffer, a RAM, and a flash memory.

13. The apparatus of claim 11, wherein the channel switching controller in the receiver includes a microprocessor and a memory.

14. The apparatus of claim 11, wherein
the storing unit is further structured to update the pilot signal stored by the storing unit using updated pilot data included in the digital broadcasting signal.

15. The apparatus of claim 14, wherein the storing unit is structured to replace the pilot data stored by the storing unit with the updated pilot data.

16. The apparatus of claim 11, wherein the apparatus is configured to extract the pilot data from the digital broadcasting signal.

17. The apparatus of claim 11, further comprising:
a first receiver unit in the receiver to receive the digital broadcast signal; and
a second receiver unit in the receiver to receive an instruction for channel switching.

18. The apparatus of claim 17, further comprising a data storage controller in the receiver to store the pilot data in the data storage and to retrieve the pilot data from the data storage.

19. A channel switching method performed by a receiver configured for digital broadcasting, comprising:
identifying, with the receiver, pilot data from a digital broadcasting signal, wherein the digital broadcasting signal comprises the pilot data and media data comprising at least one of audio packets or video packets;
storing the pilot data in a data storage in the receiver;

in response to receipt of a channel switching request in the receiver that is received separately from the digital broadcasting signal, retrieving the pilot data stored in the data storage in the receiver;

attempting to perform channel switching, with a channel switching controller in the receiver, from a channel associated with the digital broadcasting signal to the channel associated with a destination digital broadcasting signal based on at least the retrieved pilot data;

determining whether the channel switching is successful; and based on determining that channel switching is unsuccessful:
 identifying updated pilot data from the digital broadcasting signal;
 updating the pilot data in the data storage in the receiver using the updated pilot data; and
 performing channel switching at the receiver from a channel associated with the digital broadcasting signal to the channel associated with the destination digital broadcasting signal based on at least the updated pilot data.

20. The method of claim 19, further comprising:

determining, with channel switching controller in the receiver, a selected code division multiplexing channel from a plurality of code division multiplexing channels; and extracting, with the receiver, a packet identifier of one of the audio packets or video packets received in the receiver through the selected code division multiplexing channel based on the stored pilot data, wherein the performing channel switching comprises playing audio data or video data corresponding to the extracted packet identifier.

\* \* \* \* \*